No. 626,200. Patented May 30, 1899.
I. R. B. ARNOLD.
HYDROGEN GAS GENERATOR.
(Application filed Feb. 6, 1899.)
(No Model.) 2 Sheets—Sheet 1.
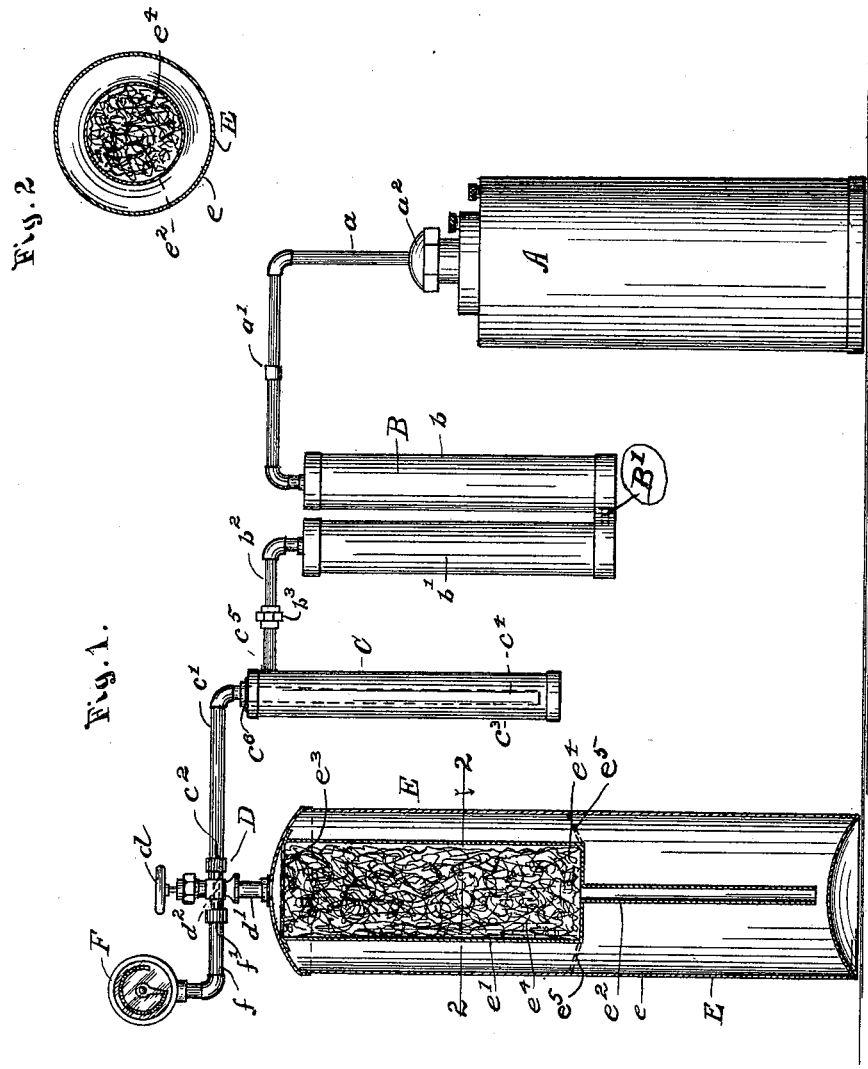

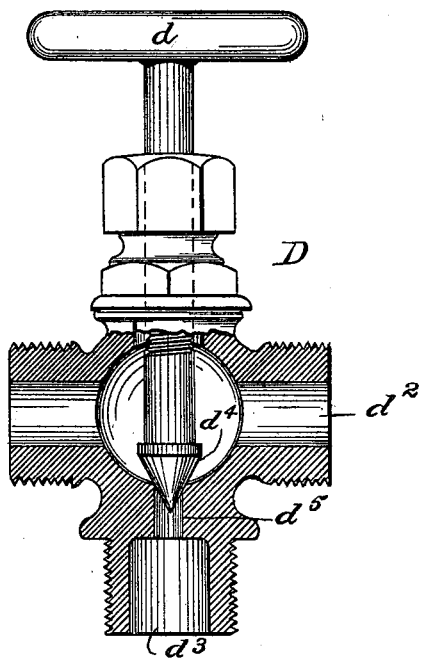

UNITED STATES PATENT OFFICE.

IRWIN R. B. ARNOLD, OF CHICAGO, ILLINOIS, ASSIGNOR TO THE STEREOPTICAN AND FILM EXCHANGE, OF SAME PLACE.

HYDROGEN-GAS GENERATOR.

SPECIFICATION forming part of Letters Patent No. 626,200, dated May 30, 1899.

Application filed February 6, 1899. Serial No. 704,607. (No model.)

*To all whom it may concern:*

Be it known that I, IRWIN R. B. ARNOLD, a citizen of the United States, and a resident of Chicago, in the county of Cook and State of Illinois, have invented certain new and useful Improvements in Hydrogen-Generators and Receptacles for the Gas Generated Thereby, of which the following, when taken in connection with the drawings accompanying and forming a part hereof, is a full and complete description, sufficient to enable those skilled in the art to which it pertains to understand, make, and use the same.

This invention relates to generators and receiving-tanks for gas used ordinarily in the production of "calcium lights," as they are known in the art, for the stereopticon and animated-picture machine; and the object of this invention is to obtain a machine whereby hydrogen gas or a substitute therefor, to be used in combination with oxygen gas in the production of a calcium light, may be readily made and stored in small bulk at a moderate pressure in large volume.

The invention may be said to consist principally in a tank of peculiar construction and having a filling arranged so that volatile liquid will be vaporized under pressure in such manner that no spray or liquid will ever be delivered from the tank, in an apparatus whereby when an inflammable gas—such as is obtained from sulfuric acid, water, and iron or zinc in a generator—is made at a pressure greater than the pressure existing in a given tank of the kind embodying this invention, such inflammable gas shall in being conveyed or conducted into the tank carry therewith or force in front thereof into such tank a volatile liquid which may be relied upon to increase several times the inflammable gas which will be delivered from the tank at a given pressure above the volume of such inflammable gas generated and delivered to such tank.

In the drawings referred to as forming a part of this specification, Figure 1 is an elevation of an apparatus embodying the invention with the receiving-tank shown in vertical section; and Fig. 2 is a horizontal sectional view of the receiving-tank on line 2 2 of Fig. 1, viewed in the direction indicated by the arrows. Fig. 3 is a vertical mid-sectional view of the needle-valve forming one of the elements of the apparatus embodying this invention.

A letter of reference applied to indicate a given part is used to designate such part throughout the several figures of the drawings wherever the same appears.

A is a generator in which are placed water, sulfuric acid, and iron (preferably in the form of nails) or zinc. What is known in the art as "hydrogen gas" is thereby generated in generator A.

$a$ is a pipe extending from generator A to part $b$ of wash-bottle B. $a'$ is a coupling interposed in pipe $a$.

B is a wash-bottle comprising parts $b$ $b'$, connected together at their lower ends, as at B'. In one of the parts $b$ $b'$ liquid, as water, is placed.

$b^2$ is a pipe extending from part $b'$ of wash-bottle B to filler C.

$b^3$ is a coupling interposed in pipe $b^2$.

C is a filler comprising an outer cylinder $C^3$, an inner cylinder $C^4$, an inlet $C^5$, and an outlet $C^6$.

$C'$ is a pipe from filler C to three-way cock D.

$C^2$ is a coupling interposed between the filler C and the three-way cock D.

E is a tank embodying a portion of this invention.

Three-way cock D has a needle-valve $d^4$, actuated to be opened or closed by the handle $d$, and such three-way cock is attached to the tank E, so that the opening from the three-way cock to the tank is closed by the needle-valve.

F is a pressure-gage, and $f$ is a pipe extending from the three-way cock D to the pressure-gage.

$f'$ is a coupling interposed in the pipe $f$.

$d^2$ is a passage-way through the three-way cock D, communicating with the passage-way $d^3$, extending into tank E, by means of the small passage-way $d^5$, forming at its upper edge the seat of needle-valve $d^4$.

$d'$ is a coupling.

The tank E comprises the outer cylinder $e$, inner cylinder $e'$, pipe $e^2$, wire-gauze (or perforated diaphragm) $e^3$, and filling material (preferably cotton) $e^4$.

When the tank E is filled ready for use, the three-way cock D may be uncoupled from the pressure-gage, as at $f'$, and from the filler C, as at coupling $C^2$. The needle-valve is then maintained in its closed position until caps are substituted for such couplings.

$a^2$ is the cover of the generator A.

The operation of the apparatus in filling the tank E is as follows: First, the pressure in the tank E is obtained by taking off the cap covering one end of the three-way cock D and replacing the coupling $f'$, pipe $f$, and pressure-gage F, and then retracting the needle of the three-way cock. If the pressure in tank E is atmospheric, there will of course be no movement of the indicating-hand of the pressure-gage F; but if the tank E has been in use and some of the contents thereof remain therein at greater than atmospheric pressure the pressure thereof will be indicated by the last-before-described operation on the face of the pressure-gage F by the hand thereof. The needle is then again seated, and the filler C is filled with volatile liquid, as with what is known in the art as "88" or "90" gasolene and attached to the three-way cock by pipe $C'$ and coupling $C^2$. Wash-bottle B is then attached to the filler C, as by coupling $b^3$, to inlet $C^5$, and the generator A (containing sulfuric acid, water, and iron or zinc) is attached to the wash-bottle by pipe $a$ and coupling $a'$. A gas known in the art as "hydrogen" gas is generated in generator A, and passing therefrom through the wash-bottle B is washed thereby and enters filler C through inlet $C^5$ thereof. The pressure of such gas on the volatilizable liquid in filler C tends to force such liquid from such filler at outlet $C^6$. A pressure is thereby obtained in the pipe $C'$ and on the pressure-gage F, and when the pressure measured on the pressure-gage is in excess of the pressure in the tank E the needle in three-way cock D is again retracted, and the gas thereafter generated in the generator A will flow therefrom through the filler C and into the tank E, carrying with it or forcing before it the volatile liquid in the filler C. The mixed gas and volatile liquid forced into the tank, as above named, passes through the filling material $e^4$, and such filling material becomes saturated with such volatile liquid. The remainder of such volatile liquid, together with the gas entering the tank E, will pass through the cylinder $e'$ and pipe $e^2$ into the cylinder $e$. The operation of filling the tank is continued until the pressure-gage F registers the desired pressure in the tank, when the needle-valve in three-way cock D is closed and the tank is ready for use.

In a tank constructed as described and of sufficient size to hold, say, ten cubic feet when the pressure therein is one hundred pounds of inflammable gas obtained by placing sulfuric acid, water, and iron (or zinc) in generator A, if the filler C is used, as hereinbefore described, and gasolene (known in the trade as "88" or "90" is placed in the filler) the increase, which is obtained in the flow of inflammable gas from the tank, is, say, thirty cubic feet, so that there will be a flow of inflammable gas from the tank E of forty cubic feet, the pressure of the contents of the tank remaining substantially unchanged—that is, one hundred pounds. This increase of discharge is obtained merely by the injection of the volatile liquid into the tank, as described, such liquid remaining in a liquid condition until the pressure of the tank is reduced by a discharge therefrom, at which time the liquid from the agitation produced by the escaping gas is volatilized and the combined product is obtained and discharged from the tank, which will when discharged with oxygen upon a piece of calcium in the ordinary way of obtaining a calcium light perform all the functions of pure hydrogen gas and equally as well. As the contents of the tank are consumed the pressure therein will gradually decrease and can be burned to obtain a calcium light until such pressure does not exceed one-half a pound, but to insure sufficient of such inflammable gas to suffice for a given entertainment the tank can be refilled at whatever pressure, the contents remaining in the tank-register by following the course above described.

The inflammable gas obtained in the manner hereinabove set forth is preferably used in combination with oxygen gas in the manner described for the production of a calcium light; but such gas may be used through a common burner for illuminating purposes.

Carbid of calcium may be placed in the generator A, together with water, and acetylene gas thereby obtained and stored in the tank E. By using the volatile liquid, hereinbefore named, in the filler C and acetylene, as described, a good gas is obtained for use in an ordinary acetylene-burner tip.

The same apparatus may be employed to generate a pure acetylene gas, in which case the volatile liquid in the filler C is omitted; but I find that acetylene gas forced into the tank E with volatile liquid from filler C makes an excellent illuminating-gas, affording a better light than common house-gas, and in fact nearly as brilliant as ordinary acetylene gas when burned from a suitable burner-tip and at much less cost than pure acetylene, in addition to obtaining much larger quantity in the tank at a given pressure.

While I have obtained the best results by using for my volatile liquid gasolene known to the trade as "88" or "90" gasolene, I do not confine myself to the use of the same, as other volatile liquid can be used to advantage in the apparatus embodying my invention.

The phrase "inner" and "outer" as applied to the spaces obtained in receptacles $e$ and $e'$ do not necessarily mean that the one surrounds the other, but rather that access to one is obtained after passing through the other—as, for instance, if the partition $e^5$ be inserted in place of the peripheral wall of the inner cylinder $e'$ the receptacle above such partition is by me termed the "inner" receptacle and the chamber below such partition is by me termed the "outer" receptacle, access to the lower (and outer) chamber being obtained through the pipe $e^2$ from the upper and inner receptacle containing the filling material $e^4$, (preferably cotton.)

It is to be understood that I do not confine myself to the use of 88 or 90 gasolene for my volatile liquid, as ether, commonly known in the art as "sulfuric ether," may be substituted for gasolene.

I am aware of the fact that volatile liquids have been inclosed in suitable receptacles and a pressure obtained thereon from oxygen gas, and that thereby the vapor obtained from such volatile liquids has been forced from the receptacle and directed against a piece of calcium (or lime) and a calcium light obtained upon igniting such vapor, and an oxygen-gas jet also directed against the piece of lime.

Having thus described my invention, what I claim as new, and desire to secure by Letters Patent, is—

1. A tank for inflammable gas comprising an outer cylinder closed at the ends, with means for attaching a communicating pipe thereto, at one of the ends, a receptacle of less capacity than the receptacle obtained by such closed cylinder placed within the cylinder and communicating with the pipe, a pipe from the bottom of the inner receptacle extending to near the bottom of the outer receptacle, a filling contained in the inner receptacle, such filling arranged to be saturated by liquid forced into the tank and to be agitated by gas, under pressure, being discharged from the tank, and means for forcing volatile inflammable liquid into the tank along with an inflammable gas; substantially as described.

2. The combination of a tank for inflammable gas comprising an outer receptacle, an inner receptacle, the inner receptacle provided with a passage-way therefrom to the space or chamber between such inner receptacle and the outer receptacle and with a passage-way from outside the outer receptacle, a gas-generator, a wash-bottle provided with a communicating passage-way from it to the generator, a filler comprising an outer receptacle and an inner receptacle communicating with the outer receptacle near the bottom thereof, such filler provided with a passage-way from the inner receptacle thereof to the inner receptacle of the tank and from the outer receptacle thereof to the wash-bottle; and means for determining the pressure in the apparatus; substantially as described.

3. The combination of a tank for inflammable gas and volatile inflammable liquid, comprising an outer receptacle, an inner receptacle, filling in the inner receptacle arranged to be saturated with the volatile liquid, the inner receptacle provided with a passage-way therefrom to the chamber between such inner receptacle and the outer receptacle, such passage-way opening into the chamber named near the bottom of the outer receptacle, and such inner chamber provided with a passage-way therefrom to outside the outer receptacle, a gas-generator, a wash-bottle provided with a communicating passage-way between it and the generator, a filler comprising an outer receptacle and an inner receptacle communicating with the outer receptacle near the bottom thereof, such filler provided with a passage-way from the inner receptacle thereof to the inner receptacle of the tank and from the outer receptacle thereof to the wash-bottle at the discharge end of the wash-bottle, and means for determining the pressure in the apparatus; substantially as described.

IRWIN R. B. ARNOLD.

Witnesses:
WILLIAM B. MOORE,
GEORGE W. BOND.